US011155190B2

(12) United States Patent
Furui et al.

(10) Patent No.: US 11,155,190 B2
(45) Date of Patent: Oct. 26, 2021

(54) VEHICLE SEAT HEATER AND VEHICLE SEAT

(71) Applicant: Panasonic Intellectual Property Management Co., Ltd., Osaka (JP)

(72) Inventors: Mio Furui, Osaka (JP); Kou Komori, Nara (JP); Takaaki Hyoudou, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/008,825

(22) Filed: Sep. 1, 2020

(65) Prior Publication Data

US 2020/0391634 A1 Dec. 17, 2020

Related U.S. Application Data

(63) Continuation of application No. PCT/JP2019/004942, filed on Feb. 13, 2019.

(30) Foreign Application Priority Data

Mar. 30, 2018 (JP) .............................. JP2018-069047

(51) Int. Cl.
*B60N 2/56* (2006.01)
*H05B 1/00* (2006.01)

(52) U.S. Cl.
CPC ...... *B60N 2/5685* (2013.01); *H05B 2203/029* (2013.01)

(58) Field of Classification Search
CPC .......................... H05B 2203/029; B60N 2/002; B60N 2/5685; B60N 2/56; B60N 2/5628; B60N 2/5635; B60N 2/5678
See application file for complete search history.

(56) References Cited

U.S. PATENT DOCUMENTS

| 4,175,297 A | * | 11/1979 | Robbins ............. A61G 7/05776 5/284 |
| 5,176,424 A | * | 1/1993 | Tobita ................. A47C 27/082 297/284.1 |

(Continued)

FOREIGN PATENT DOCUMENTS

| JP | 8-020225 | 1/1996 |
| JP | 2010-040185 | 2/2010 |

(Continued)

OTHER PUBLICATIONS

International Search Report of PCT application No. PCT/JP2019/004942 dated May 14, 2019.

*Primary Examiner* — Shin H Kim
(74) *Attorney, Agent, or Firm* — Greenblum & Bernstein, P.L.C.

(57) ABSTRACT

A vehicle seat heater is provided in a vehicle seat. This vehicle seat heater includes a first heat generator, second heat generator, and controller. The first heat generator is disposed in a first area of the vehicle seat supporting an occupant. The second heat generator is disposed in a second area not being in contact with the occupant or being less pressed by the occupant than the first area is. The controller controls current application to the first heat generator in a manner such that a heating temperature zone of the first heat generator is a direct heat transfer temperature zone close to a body temperature of the occupant, and also controls current application to the second heat generator in a manner such that a heating temperature zone of the second heat generator is a radiation heat transfer temperature zone.

9 Claims, 12 Drawing Sheets

(56) References Cited

U.S. PATENT DOCUMENTS

| | | | | | |
|---|---|---|---|---|---|
| 5,658,050 | A | * | 8/1997 | Lorbiecki | B62J 1/12 297/452.41 |
| 6,230,501 | B1 | * | 5/2001 | Bailey, Sr. | A43B 1/0054 62/51.1 |
| 6,865,825 | B2 | * | 3/2005 | Bailey, Sr. | A43B 1/0054 36/29 |
| 8,752,891 | B2 | * | 6/2014 | Yoshimoto | H05B 3/34 297/180.12 |
| 9,676,310 | B2 | * | 6/2017 | Fitzpatrick | B60N 2/5692 |
| 10,943,137 | B2 | * | 3/2021 | Choi | G05D 1/0061 |
| 2001/0045104 | A1 | * | 11/2001 | Bailey, Sr. | A43B 13/189 62/510 |
| 2002/0145512 | A1 | * | 10/2002 | Sleichter, III | B60N 2/56 340/407.1 |
| 2005/0098684 | A1 | * | 5/2005 | Gullerud | H05B 3/286 244/129.1 |
| 2009/0032518 | A1 | * | 2/2009 | Ohashi | B60N 2/56 219/202 |
| 2012/0049586 | A1 | * | 3/2012 | Yoshimoto | A47C 7/748 297/180.12 |
| 2019/0092119 | A1 | * | 3/2019 | Tsunoda | B60H 1/143 |
| 2020/0082189 | A1 | * | 3/2020 | Choi | H04L 9/3231 |

FOREIGN PATENT DOCUMENTS

| | | |
|---|---|---|
| JP | 2010-089628 | 4/2010 |
| JP | 5223357 B | 6/2013 |
| JP | 2016-120851 | 7/2016 |
| WO | 2010/137290 | 12/2010 |

* cited by examiner

VEHICLE SEAT HEATER AND VEHICLE SEAT

CROSS-REFERENCE TO RELATED APPLICATIONS

This application is a continuation of the PCT International Application No. PCT/JP2019/004942 filed on Feb. 13, 2019, which claims the benefit of foreign priority of Japanese patent application No. 2018-069047 filed on Mar. 30, 2018, the contents all of which are incorporated herein by reference.

BACKGROUND

1. Technical Field

The present disclosure relates to a seat heater provided in a vehicle seat disposed typically in a vehicle, and a vehicle seat including the seat heater.

2. Description of the Related Art

Conventionally, vehicle seats each with a heater has been known (e.g., Japanese Patent No. 5223357 and Unexamined Japanese Patent Publication No. 2010-40185). The vehicle seat disclosed in Japanese Patent No. 523357 includes first to third heater units. The first to third heater units warm thigh, buttocks part, and lower back of an occupant, respectively. Each heater unit is separately controlled by control means. In the initial mode, a heating temperature of the first heater unit is set higher than a heating temperature of the second heater unit. In the steady mode, the heating temperature of the first heater unit is set lower than the heating temperature of the second heater unit, and the heating temperature of the second heater unit is set lower than the heating temperature of the third heater unit.

A seat cushion and seat back of a vehicle seat disclosed in Unexamined Japanese Patent Publication No. 2010-40185 are provided with heating units, respectively. Each heating unit is divided into blocks. The heating unit for the seat cushion includes heating elements arranged at front, back, left, and right of the seat surface. The heating unit for the seat back includes heating elements arranged vertically and horizontally in the seat back. The state of current applied to these heating elements is changed by random number control.

SUMMARY

An object of the present disclosure is improving a quick heating performance while maintaining comfort of an occupant.

A vehicle seat heater of the present disclosure includes a first heat generator, second heat generator, and controller. The first heat generator is disposed in a first area of a vehicle seat, and generates heat by current application where the first area supports an occupant in the vehicle seat. The second heat generator is disposed in a second area of the vehicle seat, and generates heat by current application where the second area is not in contact with or pressed weaker by the occupant than the first area. The controller controls the current application to the first heat generator in a manner such that a heating temperature zone of the first heat generator is a direct heat transfer temperature zone close to a body temperature of the occupant. The controller also controls the current application to the second heat generator in a manner such that a heating temperature zone of the second heat generator is a radiation heat transfer temperature zone.

With this configuration, a part of the seated occupant that relatively strongly presses the vehicle seat is warmed at a temperature close to the body temperature by the first heat generator. Still more, a part of the seated occupant that relatively weakly presses the vehicle seat is warmed at a temperature in the radiation heat transfer temperature zone by the second heat generator. Furthermore, a part of the seated occupant that is not in contact with the seat is warmed by radiation heat of the second heat generator. Accordingly, the occupant can be warmed in a wide range, including not only the part of the occupant that relatively strongly presses the vehicle seat but also other part and particularly the part not in contact with the seat. This improves quick heating performance. In addition, the parts of the occupant are heated in different temperature zones, thus warming according to the occupant's thermal perception can be performed.

The present disclosure can maintain comfort while warming the occupant by the vehicle seat heater.

DETAILED DESCRIPTION OF PREFERRED EMBODIMENTS

Prior to describing exemplary embodiments of the present disclosure, circumstances behind the present disclosure is briefly described.

In Japanese Patent No. 5223357, a heating temperature of each of the first to third heater units is changed between the initial mode and the steady mode. Each of these three heater units is installed in an area to which weight of a seated occupant is applied, i.e., an area strongly pressed by the occupant. Accordingly, the heat is transferred to a part of the occupant in contact with the seat.

To improve a quick effect of heating (hereinafter referred to as "quick heating performance") by the seat heater in Japanese Patent No. 5223357, a temperature in the area strongly pressed by the occupant needs to be increased. In this case, however, the occupant easily feels hot, and thus comfortable warming is difficult. To avoid the situation, the temperature of each heater unit needs to be set lower as a whole. This leaves a room for improvement with respect to thermal comfort.

As disclosed in Unexamined Japanese Patent Publication No. 2010-40185, the heating units for a seat cushion and a seat back are provided in a broad area of the seat surface and a seat back surface to expand the heating area.

However, Unexamined Japanese Patent Publication No. 2010-40185 aims to give stimulus of warmth sensation to the occupant by changing the state of current application to multiple heating elements by the random number control, and thus its structure is not intended for improving the quick heating performance.

Hereinafter, various exemplary embodiments of the present disclosure are described in detail with reference to drawings. Preferred embodiments described herein are illustrative in nature, and are not intended to restrict the present disclosure, its applications, and its purpose of use.

First Exemplary Embodiment

Figure 1:
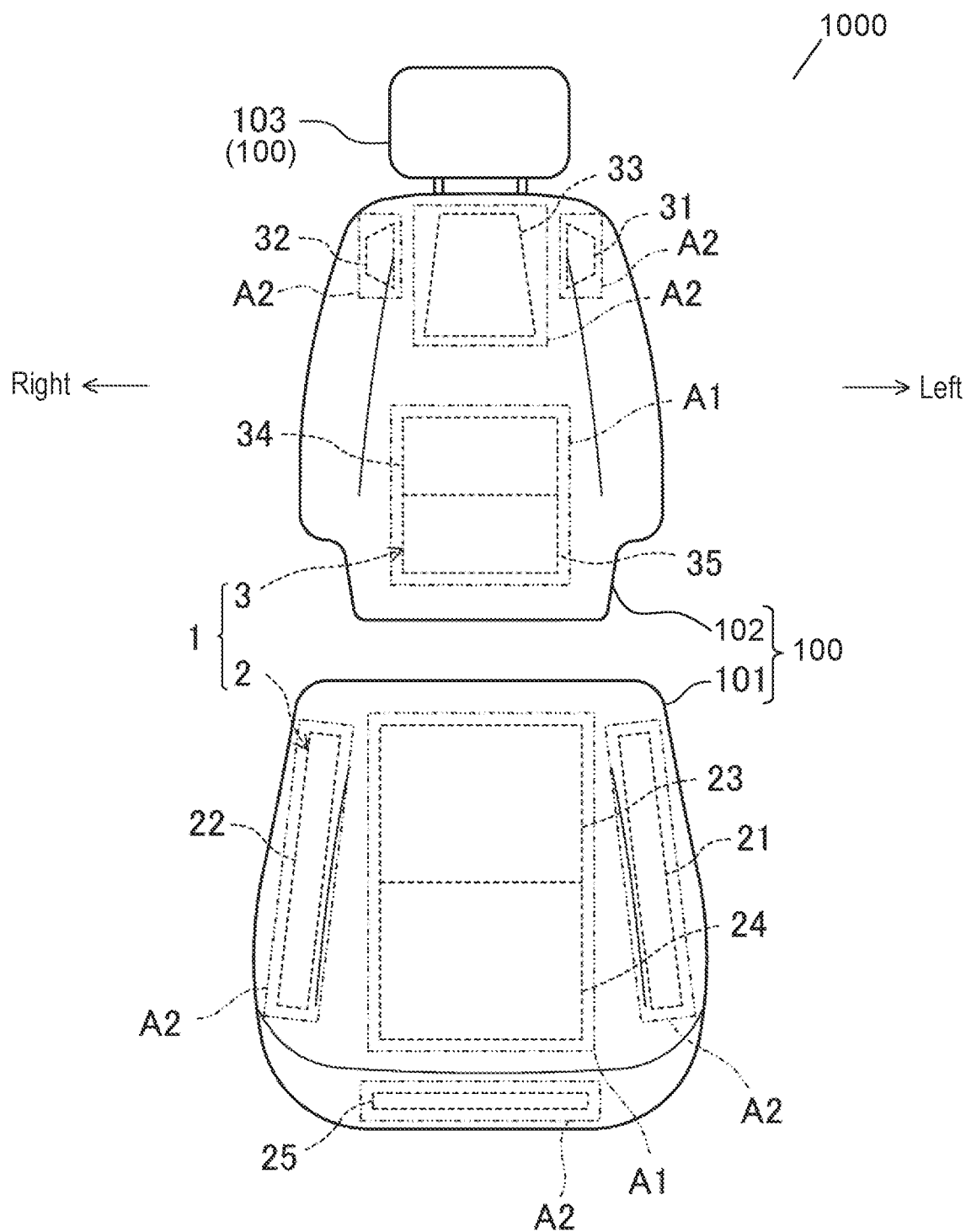
FIG. 1 illustrates a state that a vehicle seat equipped with a vehicle seat heater in accordance with a first exemplary embodiment of the present disclosure is divided into a seat cushion and a seat back.

FIG. 1 illustrates a state that vehicle seat body 100 (hereinafter referred to as "seat body") with built-in vehicle seat heater (hereinafter referred to as "seat heater") 1 is divided into seat cushion 101 and seat back 102, in accordance with a first exemplary embodiment of the present disclosure. More specifically, vehicle seat 1000 in the present exemplary embodiment includes seat body 100 and seat heater 1 installed in seat body 100. In the following description, "front" is a front side in the vehicle forward movement direction, "back" is a back side in the vehicle forward movement direction, "left" is a left side in the vehicle forward movement direction, and "right" is a right side in the vehicle forward movement direction. Furthermore, the "front-back" dimension of a heating element is a dimension in the vehicle forward movement direction, and the "left-right" dimension of the heating element is a dimension in the horizontal direction of the vehicle.

Vehicle seat 1000 described in the present exemplary embodiment configures a driver's seat, but the structure of vehicle seat 1000 may be applied to a front passenger's seat or a rear seat. Furthermore, vehicle seat 1000 may be applied to a so-called bench seat on which a plurality of persons can be seated from side to side.

Seat body 100 includes seat cushion 101, seat back 102, reclining mechanism (not illustrated), and headrest 103. Seat cushion 101 can also be called a seating section and mainly supports the part from the buttocks (hip) to the thigh of the occupant from beneath. Seat back 102 is also called a seat backrest, and mainly supports the lower back, back, around shoulder blades, and shoulders of the occupant from behind. A rear end of seat cushion 101 and a lower end of seat back 102 are connected via the reclining mechanism. The reclining mechanism allows seat back 102 to change its inclination relative to seat cushion 101 around a horizontal axis extending right and left. Such a reclining mechanism is conventionally known. More specifically, an angle of seat back 102 relative to seat cushion 101 is changed and seat back 102 is fixed at any given angle by the reclining mechanism. Headrest 103 is provided at an upper end of seat back 102. Headrest 103 and seat back 102 may be integrally formed.

A seating posture of the occupant can be changed by adjusting a front-back position of seat body 100 by a sliding device (not illustrated) and angle of seat back 102 by the reclining mechanism. Furthermore, although not illustrated, the seating posture of the occupant can be changed by an elevating device of vehicle seat 100 and a tilting device of seat cushion 101. Note that each of the adjustment mechanisms is not essential, and one or more of them may be omitted.

In the following description, it is assumed that the occupant has an average height and weight of an adult (male or female) and occupant's seating posture is a standard seating posture. In other words, when the occupant is a driver, a safe driving posture is assumed. When the occupant is a front passenger or a rear seat passenger, a general seating posture is assumed. This means non-standard seating postures, such as shifting the lower back forward to slightly lie on the seat, are excluded.

Vehicle seat 1000 may also be referred to as a seat with seat heater 1 or a seat with heating function for warming a predetermined part of the occupant, as described later. The predetermined part of the occupant includes thigh, buttocks, lower back, back, around shoulder blades, shoulders, and back of neck. A part of the occupant to be warmed is a part with high thermal sensitivity. "High thermal sensitivity" means a high sensitivity to a temperature change, and it is a part sensitive to warming. There is an individual difference in the predetermined part among occupants, but the occupant's back part of the thigh, part from back of the thigh to inner crotch, part from buttocks to back of the thigh, back, and lower back are considered as a part with high thermal sensitivity.

(Overall Configuration of Seat Heater 1)

Figure 2:
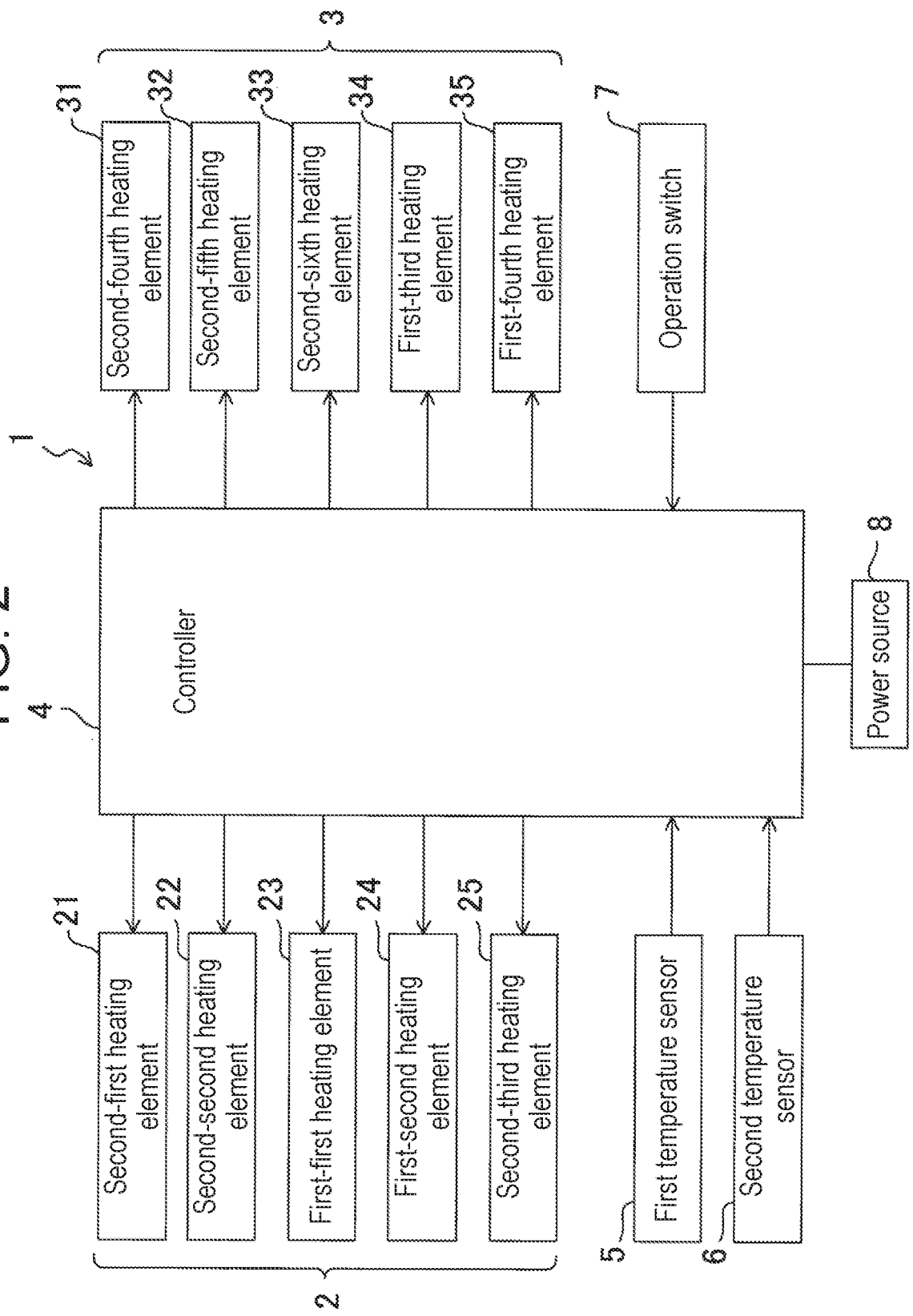
FIG. 2 is a block diagram of the vehicle seat heater in accordance with the first exemplary embodiment.

FIG. 2 is a block diagram of seat heater 1. Seat heater 1 includes seat cushion heat generating unit (hereinafter referred to as "first heat generating unit") 2, seat back heat generating unit (hereinafter referred to as "second heat generating unit") 3, controller 4, first temperature sensor 5, second temperature sensor 6, operation switch 7, and power source 8. As shown in FIG. 1, first heat generating unit 2 is built (installed) in seat cushion 101, and second heat generating unit 3 is built (installed) in seat back 102. Only one of first heat generating unit 2 and second heat generating unit 3 may be provided.

First heat generating unit 2 mainly warms the buttocks and the thigh. Second heat generating unit 3 mainly warms the lower back, the back, the part around shoulder blades, and shoulders. First temperature sensor 5 and second temperature sensor 6 measure temperatures of seat surface material and cushioning material that are directly heated by first heat generating unit 2 and second heat generating unit 3, and temperatures of heating elements described later. Each of first temperature sensor 5 and second temperature sensor 6 includes, for example, a thermistor. Operation switch 7 is provided for turning on and off seat heater 1, and is disposed near seat body 100 or in an instrument panel (not illustrated) inside the vehicle. Operation switch 7 may also be configured to set a heat generating level of seat heater 1. Power source 8 is, for example, an in-vehicle battery.

(Structure of First Heat Generating Unit 2)

Figure 3:
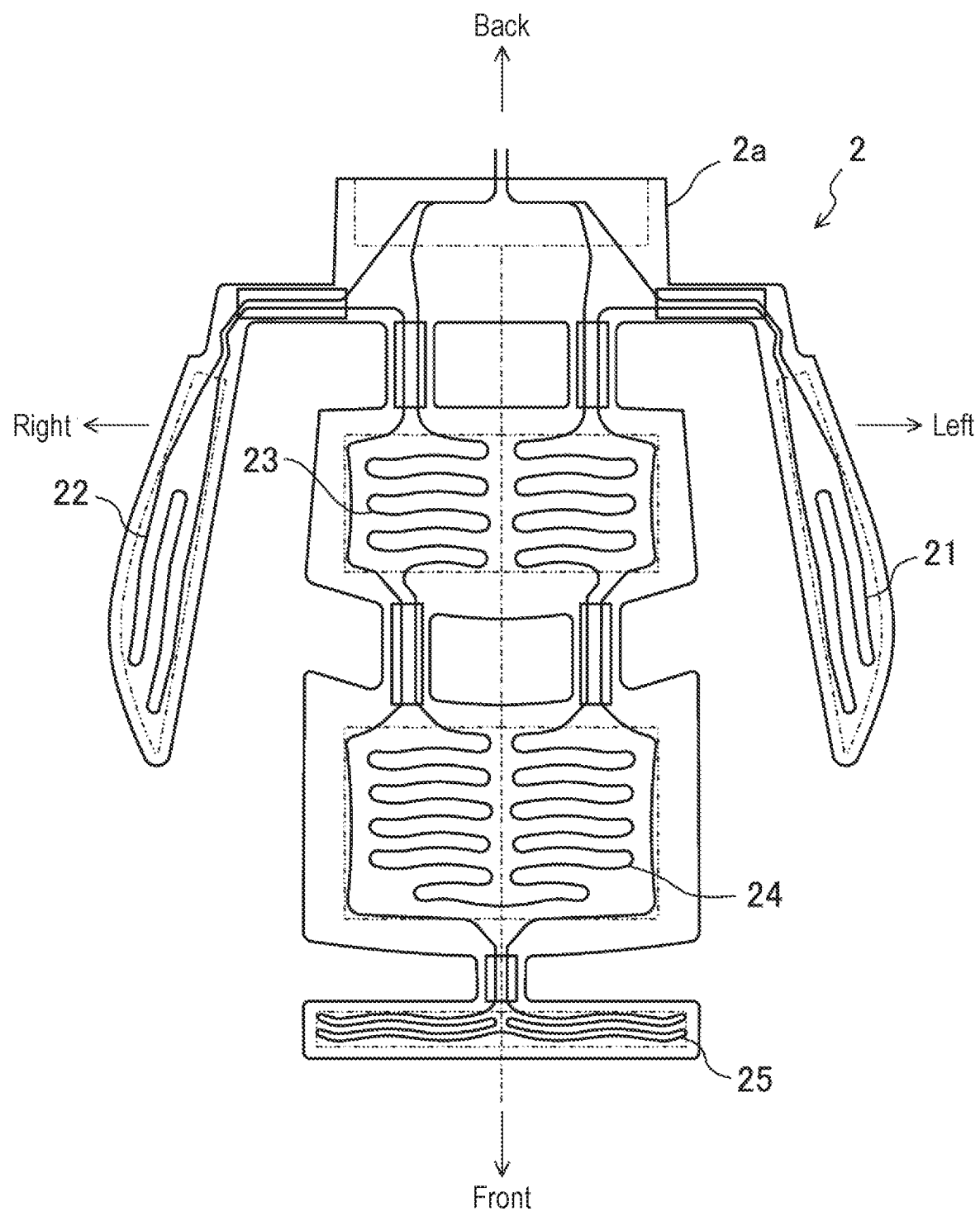
FIG. 3 is a development view of a heat generating unit for the seat cushion shown in FIG. 1.

FIG. 3 is a development view of first heat generating unit 2. As shown in FIG. 1 to FIG. 3, first heat generating unit 2 includes left cushion heating element (hereinafter referred to as "second-first heating element") 21, right cushion heating element (hereinafter referred to as "second-second heating element") 22, buttocks heating element (hereinafter referred to as "first-first heating element") 23, thigh heating element (hereinafter referred to as "first-second heating element") 24, and front cushion heating element (hereinafter referred to as "second-third heating element") 25. Each of second-first heating element 21, second-second heating element 22, first-first heating element 23, first-second heating element 24, and second-third heating element 25 include a wire that generates Joule heat by applying current. In other words, each of the heating elements in the present exemplary embodiment employs a phenomenon of generating heat when an electric current passing through an object changes to heat energy. Each heating element can be configured with, for example, a nichrome wire.

The amount of heat generated by the aforementioned wire changes according to the magnitude of current flowing through the wire, and also according to the duration of the current flow. Controller 4, described later, changes (controls) the magnitude and duration of current supplied to each of second-first heating element 21, second-second heating element 22, first-first heating element 23, first-second heating element 24, and second-third heating element 25, individually.

As shown in FIG. 3, first heat generating unit 2 includes base member 2a formed of a sheet-shaped heat resistant material. The wire included in each of second-first heating element 21, second-second heating element 22, first-first heating element 23, first-second heating element 24, and second-third heating element 25 is fixed onto base member 2a. This is the structure of thin and integrated first heat generating unit 2. First heat generating unit 2 can be disposed between the seat surface material of seat cushion 101 and a cushioning material covered by this seat surface material. In other words, first heat generating unit 2 is embedded and built in seat cushion 101. Note that second-first heating element 21, second-second heating element 22, first-first heating element 23, first-second heating element 24, and second-third heating element 25 may be separate elements, or some of them may be integrated.

second-first heating element 21, second-second heating element 22, first-first heating element 23, first-second heating element 24, and second-third heating element 25 are disposed at positions indicated in FIG. 1, respectively. More specifically, first-first heating element 23 is disposed at the back (rear side) on the upper face (seat surface) of seat cushion 101. The buttocks of the occupant in the standard seating posture locate immediately above first-first heating element 23. First-second heating element 24 is disposed at the front (front side) on the upper face of seat cushion 101. The thigh of the occupant in the standard seating posture locates immediately above first-second heating element 24. A portion immediately under the buttocks and the thigh of the occupant is an area to which a force by the weight of occupant is applied. In particular, a larger force is applied to a portion immediately under the buttocks than that to a portion immediately under the thigh. The area supporting occupant's buttocks and thigh in seat cushion 101 is first area A1 shown in FIG. 1. First-first heating element 23 and first-second heating element 24 are disposed in first area A1. First-first heating element 23 and first-second heating element 24 are disposed in first area A1 supporting the occupant in seat body 100, and are part of the first heat generator that generates heat by applying current.

The front-back dimension of first-first heating element 23 is set to correspond to the front-back dimension of the occupant's buttocks. The left-right dimension of first-first heating element 23 is set to correspond to the left-right dimension of the occupant's buttocks, and is longer than the left-right dimension of each of second-first heating element 21 and second-second heating element 22.

The rear end of first-second heating element 24 is slightly separated to the front from the front end of first-first heating element 23. The front end of first-second heating element 24 is close to the front end of the upper face of seat cushion 101. The front-back dimension of first-second heating element 24 is set to correspond to the front-back dimension of the occupant's thigh, and is longer than the front-back dimension of first-first heating element 23. The left-right dimension of first-second heating element 24 is substantially equal to the left-right dimension of first-first heating element 23.

Second-first heating element 21 is disposed near the left end of seat cushion 101 on the upper face of seat cushion 101. The front-back dimension of second-first heating element 21 is set longer than its left-right dimension. Accordingly, second-first heating element 21 is disposed extending in the front-back direction near the left end of the upper face of seat cushion 101. Second-second heating element 22 is disposed near the right end of seat cushion 101 on the upper face of seat cushion 101. The front-back dimension of second-second heating element 22 is set longer than its left-right dimension, same as second-first heating element 21. Accordingly, second-second heating element 22 is disposed extending in the front-back direction near the right end of the upper face of seat cushion 101.

When the occupant is an adult with average height and weight and taking the standard seating posture, the occupant's thigh locates at a position almost off the position immediately above second-first heating element 21 and second-second heating element 22. For example, the occupant's thigh locates between second-first heating element 21 and second-second heating element 22. The vicinity of the left end and the vicinity of the right end on the upper face of seat cushion 101 is second area A2 (shown in FIG. 1). Second area A2 is not in contact with the occupant in seat body 100 or is less pressed by the occupant than first area A1 is. Second-first heating element 21 and second-second heating element 22 are disposed in second area A2. Accordingly, second-first heating element 21 and second-second heating element 22 are disposed in second area A2 which is not in contact with the occupant in vehicle seat 1000 or less pressed by the occupant than first area A1 is, and are part of a second heat generator that generates heat by applying current.

Second-third heating element 25 is disposed near the upper end of a front face of seat cushion 101. Second-third heating element 25 extends right and left, and the left end of second-third heating element 25 is positioned near the occupant's left knee back, and the right end of second-third heating element 25 is positioned near the occupant's right knee back.

When the occupant is taking the standard seating posture, a part of the occupant below the thigh (e.g., knee back) locates at a position separated from the above or front of second-third heating element 25. An area near the upper end of the front face of seat cushion 101 is second area A2 (shown in FIG. 1) which is not in contact with the occupant in vehicle seat 1000, and second-third heating element 25 is disposed in second area A2. Second-third heating element 25 is also part of the second heat generator.

The amount of heat generated by each of second-first heating element 21, second-second heating element 22, first-first heating element 23, first-second heating element 24, and second-third heating element 25 can be changed by a current value, duration of current application, and so on by controller 4. It can also be changed by the density of the wire included in each of these heating elements. When the density of the wire per unit area is greater, a heat flux is increased. Conversely, when the density of the wire per unit area is lower, a heat flux is decreased.

In the exemplary embodiment, the density of the wire of each heating element is set such that the heat flux of each of first-first heating element 23 and first-second heating element 24 is lower than the heat flux of each of second-second heating element 21, second-second heating element 22, and second-third heating element 25. In addition, controller 4 controls current application to each heating element so as to satisfy the above-mentioned relation between the heat fluxes. More specifically, current application to each of first-first heating element 23 and first-second heating element 24 is controlled to achieve the heat flux of 300 W/m$^2$ or greater and 500 W/m$^2$ or less for first-first heating element 23 and first-second heating element 24. Still more, current application to each of second-first heating element 21, second-second heating element 22, and second-third heating element 25 is controlled to achieve the heat flux of 200 W/m$^2$ or greater and 400 W/m$^2$ or less for second-first heating element 21, second-second heating element 22, and second-third heating element 25.

As shown in FIG. 2, second-first heating element 21, second-second heating element 22, first-first heating element 23, first-second heating element 24, and second-third heating element 25 are connected to controller 4. Controller 4 controls the current application to each heating element.

(Structure of Second Heat Generating Unit 3)

Figure 4:
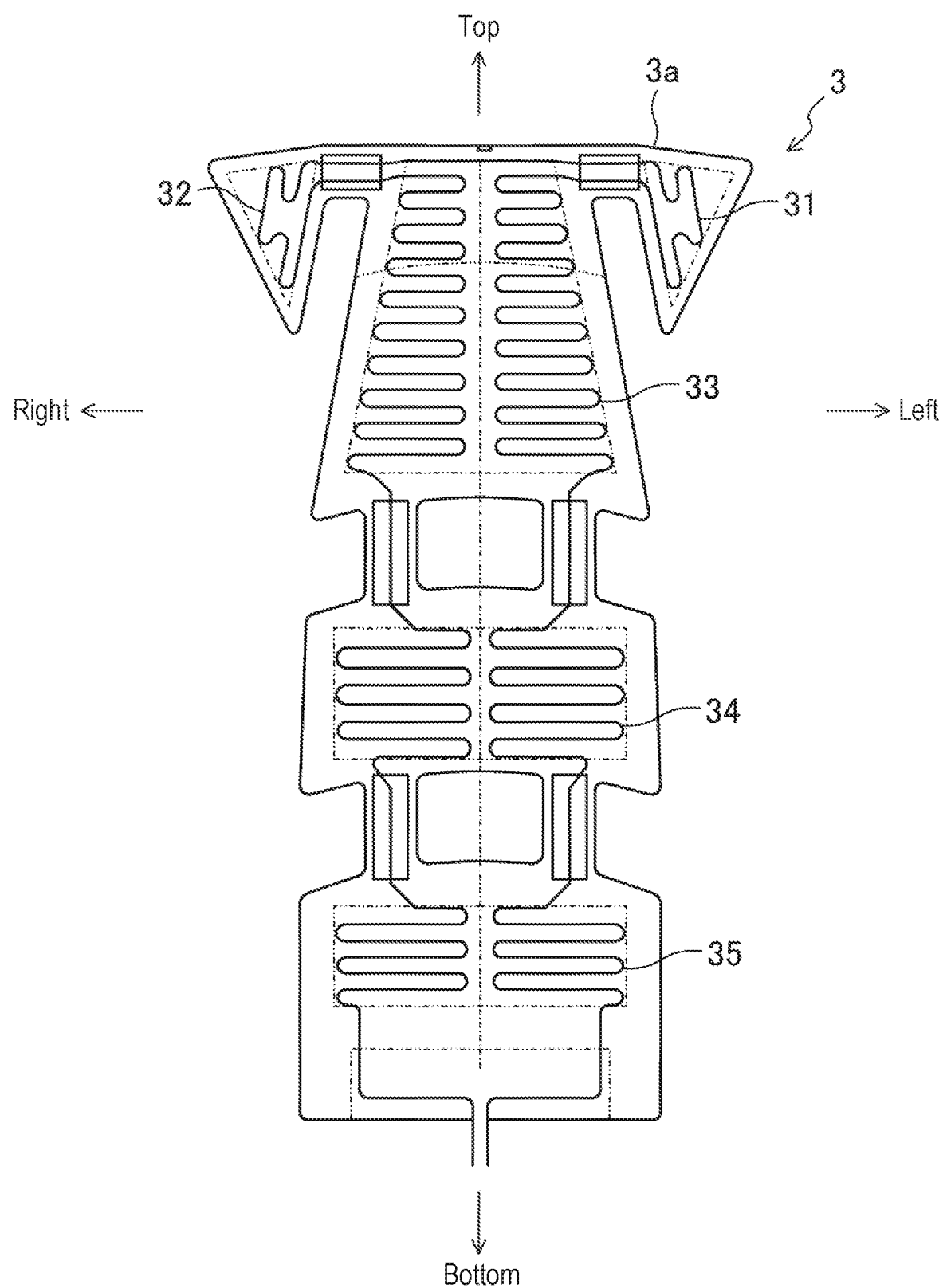
FIG. 4 is a development view of a heat generating unit for the seat back shown in FIG. 1.

FIG. 4 is a development view of second heat generating unit 3. As shown in FIG. 1, FIG. 2, and FIG. 4, second heat generating unit 3 includes left shoulder side heating element (hereinafter referred to as "second-fourth heating element") 31, right shoulder side heating element (hereinafter referred to as "second-fifth heating element") 32, upper center heating element (hereinafter referred to as "second-sixth heating element") 33, back heating element (hereinafter referred to as first-third heating element) 34, and lower back heating element (hereinafter referred to as first-fourth heating element) 35. Each of second-fourth heating element 31, second-fifth heating element 32, second-sixth heating element 33, first-third heating element 34, and first-fourth heating element 35 includes a wire that generates Joule heat by applying current, same as each heating element of first heat generating unit 2. Controller 4 changes (controls) the magnitude and duration of current supplied to each of second-fourth heating element 31, second-fifth heating element 32, second-sixth heating element 33, first-third heating element 34, and first-fourth heating element 35, individually.

As shown in FIG. 4, second heat generating unit 3 includes base member 3a formed of a sheet-shaped heat resistant material. The wire included in each of second-fourth heating element 31, second-fifth heating element 32, second-sixth heating element 33, first-third heating element 34, and first-fourth heating element 35 is fixed onto base member 3a. This is the structure of thin and integrated second heat generating unit 3. Second heat generating unit 3 can be disposed between the seat surface material of seat back 102 and a cushioning material covered by this seat surface material. In other words, second heat generating unit 3 is embedded and built in seat back 102. Note that second-fourth heating element 31, second-fifth heating element 32, second-sixth heating element 33, first-third heating element 34, and first-fourth heating element 35 may be separate elements, or some of them may be integrated.

Second-fourth heating element 31, second-fifth heating element 32, second-sixth heating element 33, first-third heating element 34, and first-fourth heating element 35 are disposed at positions shown in FIG. 1, respectively. More specifically, first-third heating element 34 is disposed on the lower side from the center in the vertical direction on a front face (backrest face) of seat back 102. The back of the occupant taking the standard seating posture locates immediately in front of first-third heating element 34. First-fourth heating element 35 is disposed below first-third heating element 34 on the front face of seat back 102. The lower back of the occupant taking the standard seating posture locates immediately in front of first-fourth heating element 35. A portion immediately behind the back and lower back of the occupant is an area to which a force by the weight of occupant is applied. In particular, a larger force is applied to a portion immediately behind the lower back than that to a portion immediately behind the back. An area supporting the back and the lower back of the occupant in seat back 102 is first area A1 shown in FIG. 1. First-third heating element 34 and first-fourth heating element 35 are disposed in first area A1. First-third heating element 34 and first-fourth heating element 35 are part of the first heat generator.

The left-right dimension of first-third heating element 34 is set to correspond to the left-right dimension of the occupant's back. The vertical dimension of first-third heating element 34 is set to correspond to the vertical dimension of the occupant's back. The left-right dimension of first-fourth heating element 35 is set to correspond to the left-right dimension of the occupant's lower back. The vertical dimension of first-fourth heating element 35 is set to correspond to the vertical dimension of the occupant's lower back.

Second-fourth heating element 31 is disposed on the vicinity of the upper left end of the front face of seat back 102. Second-fifth heating element 32 is disposed on the vicinity of the upper right end of the front face of seat back 102. The bottom end of second-fourth heating element 31 and the bottom end of second-fifth heating element 32 are disposed above first-third heating element 34 so that they do not reach the occupant's back.

When the occupant is an adult with average height and weight and taking the standard seating posture, the left shoulder and right shoulder locate at the positions out of the area immediately in front of second-fourth heating element 31 and second-fifth heating element 32, respectively. For example, second-fourth heating element 31 is positioned beside the left shoulder, and second-fifth heating element 32 is positioned beside the right shoulder. An area near the upper left end and an area near the upper right end of the front face of seat back 102 are second areas A2 (FIG. 1) which are not in contact with the occupant in vehicle seat 1000 or less pressed by the occupant than first area A1 is. Second-fourth heating element 31 and second-fifth heating element 32 are disposed in second areas A2. Second-fourth heating element 31 and second-fifth heating element 32 are also part of the second heat generator.

Second-sixth heating element 33 is disposed between second-fourth heating element 31 and second-fifth heating element 32 on the front face of seat back 102. The left-right dimension of second-sixth heating element 33 is longer than the left-right dimension of each of second-fourth heating element 31 and second-fifth heating element 32. The upper end of second-sixth heating element 33 and the upper ends of second-fourth heating element 31 and second-fifth heating element 32 are leveled at substantially the same height. However, they may not be leveled. The lower end of second-sixth heating element 33 is separated upward from the upper end of first-third heating element 34. The vertical dimension of second-sixth heating element 33 can be longer than the vertical dimension of first-third heating element 34. The left-right dimension of the upper part of second-sixth heating element 33 can be shorter than the left-right dimension of the lower part of second-sixth heating element 33. In this case, the width of the upper part becomes narrower than the lower part in second-sixth heating element 33.

When the occupant is taking the standard seating posture, the occupant's weight is not so much applied to the upper part of seat back 102. Accordingly, the upper part of seat back 102 is second area A2 which is less pressed by the occupant than first area A1 is. Second-sixth heating element 33 is disposed in second area A2. Second-sixth heating element 33 is part of the second heat generator.

The amount of heat generated by each of second-fourth heating element 31, second-fifth heating element 32, second-sixth heating element 33, first-third heating element 34, and first-fourth heating element 35 can be changed according to the current value, duration of current application, and so on by controller 4. It can also be changed by the density of the wire included in each of these heating elements. When the density of the wire per unit area is greater, a heat flux is increased. Conversely, when the density of the wire per unit area is lower, a heat flux is decreased.

In the present exemplary embodiment, the density of the wire of each heating element is such that the heat flux of each of first-third heating element 34 and first-fourth heating element 35 is lower than the heat flux of each of second-fourth heating element 31, second-fifth heating element 32, and second-sixth heating element 33. In addition, controller 4 controls current application to each heating element so as to satisfy the above-mentioned relation between the heat fluxes. More specifically, current application to each of first-third heating element 34 and first-fourth heating element 35 is controlled to achieve the heat flux of 300 W/m² or greater and 500 W/m² or less for first-third heating element 34 and first-fourth heating element 35. Still more, current application to each of second-fourth heating element 31, second-fifth heating element 32, and second-sixth heating element 33 is controlled to achieve the heat flux of 200 W/m² or greater and 400 W/m² or less for second-fourth heating element 31, second-fifth heating element 32, and second-sixth heating element 33.

As shown in FIG. 2, second-fourth heating element 31, second-fifth heating element 32, second-sixth heating element 33, first-third heating element 34, and first-fourth heating element 35 are connected to controller 4. Controller 4 controls the current application to each heating element.

As described above, by setting the heat flux of the first heat generator during heating to not less than 300 W/m² and not greater than 500 W/m², excessive temperature rise can be suppressed while improving the quick heating performance by the first heat generator. Still more, by setting the heat flux of the second heat generator during heating to not less than 200 W/m² and not greater than 400 W/m², excessive temperature rise can be suppressed while improving the quick heating performance by the second heat generator.

(Structure of Temperature Sensors)

First temperature sensor 5 shown in FIG. 2 detects the surface temperature of the seat surface material heated by the first heat generator. The first heat generator includes first-first heating element 23, first-second heating element 24, first-third heating element 34, and first-fourth heating element 35. Accordingly, multiple first temperature sensors 5 are provided to dispose one each near first-first heating element 23, first-second heating element 24, first-third heating element 34, and first-fourth heating element 35 in seat body 100. First temperature sensor 5 may measure the temperature of the heating element or the temperature of the seat surface material. When the temperature of the heating element is measured, first temperature sensor 5 or controller 4 estimates the surface temperature of the seat surface material based on the temperature of the heating element.

Second temperature sensor 6 shown in FIG. 2 detects the surface temperature of the seat surface material heated by the second heat generator. The second heat generator includes second-first heating element 21, second-second heating element 22, second-third heating element 25, second-fourth heating element 31, second-fifth heating element 32, and second-sixth heating element 33. Accordingly, multiple second temperature sensors 6 are provided to dispose one each near second-first heating element 21, second-second heating element 22, second-third heating element 25, second-fourth heating element 31, second-fifth heating element 32, and second-sixth heating element 33. Second temperature sensor 6 may measure the temperature of the heating element or the temperature of the seat surface material. When the temperature of the heating element is measured, second temperature sensor 6 or controller 4 estimates the surface temperature of the seat surface material based on the temperature of the heating element.

First temperature sensor 5 and second temperature sensor 6 are connected to controller 4. Controller 4 can obtain a temperature value based on values detected by first temperature sensor 5 and second temperature sensor 6. First temperature sensor 5 and second temperature sensor 6 may be provided on each heating element or on only some of the heating elements.

(Control by Controller 4)

Next is described the control by controller 4. Controller 4 detects a state of operation switch 7 shown in FIG. 2. When controller 4 detects that operation switch 7 is turned on, controller 4 supplies a predetermined current to each heating element in first heat generating unit 2 and second heat generating unit 3 according to temperatures detected by first temperature sensor 5 and second temperature sensor 6. When temperatures detected by first temperature sensor 5 and second temperature sensor 6 are extremely low or when "high" is set by operation switch 7, the current value can be increased, compared with other cases.

Controller 4 controls the current applied to each of first-first heating element 23, first-second heating element 24, first-third heating element 34, and first-fourth heating element 35 as the first heat generator in a manner such that a heating temperature zone of these heating elements is a direct heat transfer temperature zone close to the occupant's body temperature. As described above, first-first heating element 23, first-second heating element 24, first-third heating element 34, and first-fourth heating element 35 are disposed in the area to which a large force is applied due to the weight of occupant. Accordingly, the seat surface material heated by first-first heating element 23, first-second heating element 24, first-third heating element 34, and first-fourth heating element 35 is strongly pressed by the occupant. The heat of each heating element is thus directly transmitted to the parts of the occupant seated in vehicle seat 1000 that relatively strongly press vehicle seat 1000. The occupant is warmed at a temperature close to the body temperature. Accordingly, the heating temperature zone of first-first heating element 23, first-second heating element 24, first-third heating element 34, and first-fourth heating element 35 is the direct heat transfer temperature zone. By setting the direct heat transfer temperature zone close to occupant's body temperature, the occupant does not feel too hot, and comfort can be enhanced. The lower limit of the temperature close to the occupant's body temperature is, for example, 33° C. The upper limit is, for example 39° C., preferably 37° C., and further preferably 35° C. However, other limits are acceptable as long as the temperature limit can prevent a low-temperature burn and maintain a comfortable warming condition.

Controller 4 controls the current applied to each of second-first heating element 21, second-second heating element 22, second-third heating element 25, second-fourth heating element 31, second-fifth heating element 32, and second-sixth heating element 33 as the second heat generator in a manner such that a heating temperature zone of these heating elements is a radiation heat transfer temperature zone higher than the aforementioned direct heat transfer temperature zone. Second-first heating element 21, second-second heating element 22 second-third heating element 25, second-fourth heating element 31, and second-fifth heating element 32 are disposed in areas with which the occupant in vehicle seat 1000 is hardly in contact. Therefore, each part of the occupant is warmed by the radiation heat. Since the second heat generator warms the occupant by the radiation heat, the occupant hardly feels too hot even though the radiation heat transfer temperature zone is higher than the aforementioned direct heat transfer temperature zone. The lower limit of the radiation heat transfer temperature zone is, for example, 42.5° C., and preferably 43° C. The upper limit is, for example, 46.5° C., and preferably 46° C.

Second-sixth heating element 33 is disposed in an area which is relatively weakly pressed by the occupant in vehicle seat 1000, and part of the occupant between the shoulders is warmed by the heat of second-sixth heating element 33. Since the occupant relatively weakly presses the area where second-sixth heating element 33 is disposed, the occupant hardly feels too hot even though the radiation heat transfer temperature zone is higher than the aforementioned direct heat transfer temperature zone.

Figure 5:
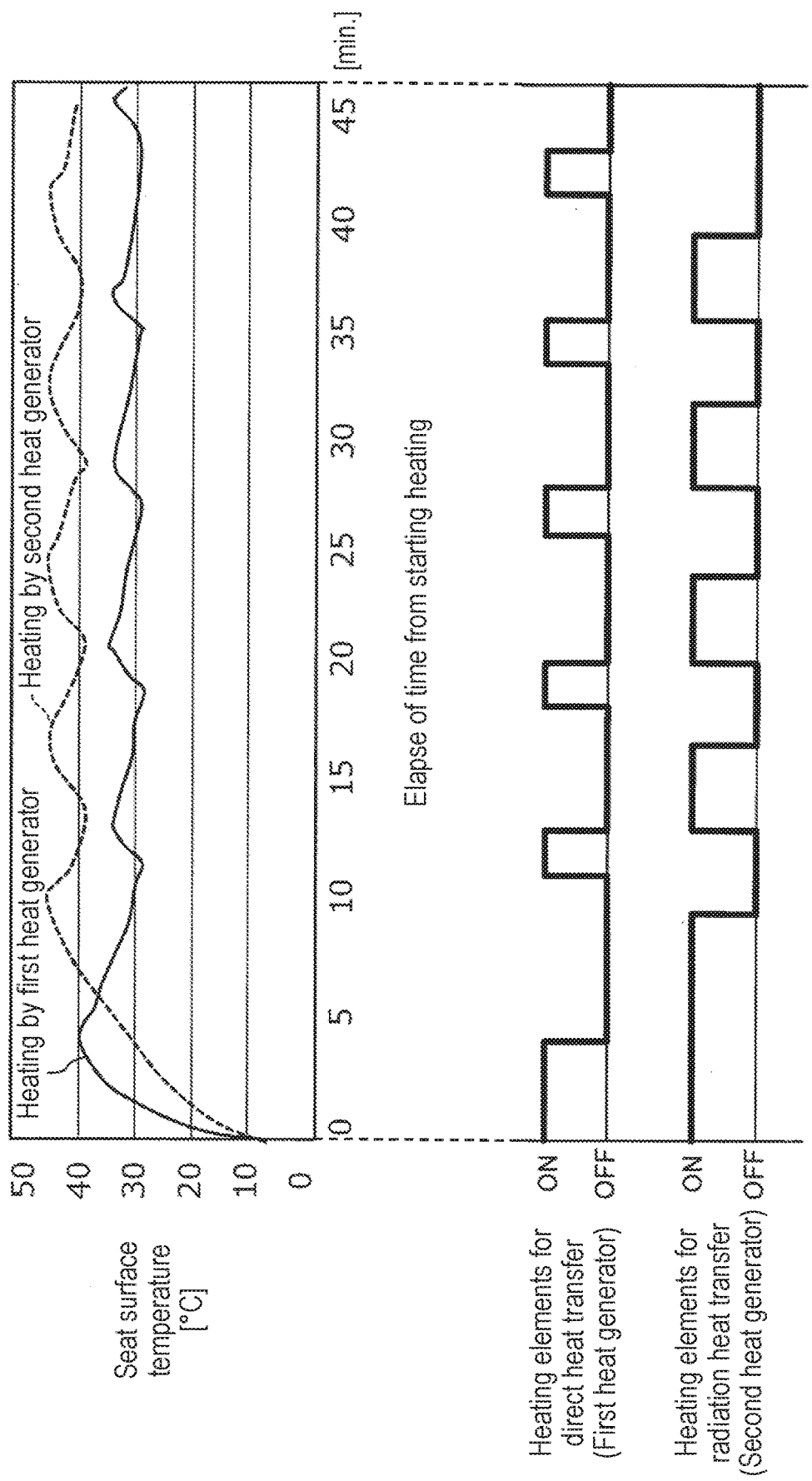
FIG. 5 is a graph showing changes of a seat surface temperature of the vehicle seat shown in FIG. 1 and a current application control time chart for heating elements.

FIG. 5 is a graph illustrating changes of the seat surface temperature of vehicle seat 1000 and a current application control time chart of the heating elements in the present exemplary embodiment. In the graph in FIG. 5, the solid line indicates the surface temperature of the seat surface material heated by the first heat generator (first-first heating element 23, first-second heating element 24, first-third element 34, and first-fourth heating element 35), and the broken line indicates the surface temperature of the seat surface material heated by the second heat generator (second-first heating element 21, second-second heating element 22 second-third heating element 25, second-fourth heating element 31, second-fifth heating element 32, and second-sixth heating element 33). The vertical axis indicates the surface temperature of the seat surface material, and the horizontal axis indicates the elapse of time from starting heating. Before heating, the surface temperature is 10° C. or below.

The upper section of the time chart in FIG. 5 shows the current application state of the first heat generator: ON is an energized state and OFF is a non-energized state. The lower section of the time chart in FIG. 5 shows the current application state of the second heat generator: ON is an energized state and OFF is a non-energized state.

At starting heating, current is applied to both the first heat generator and second heat generator. When the surface temperature of the seat surface material heated by the first heat generator reaches close to the body temperature (direct heat transfer temperature zone), the first heat generator is switched to the non-energized state. Since the heating temperature by the second heat generator is higher than that of the first heat generator, the energized state of the second heat generator continues after the first heat generator is switched to the non-energized state. When the surface temperature of the seat surface material heated by the second heat generator reaches around, for example, 43° C. to 46° C., the second heat generator is switched to the non-energized state. When the surface temperature of the seat surface material heated by the first heat generator lowers and falls out of the direct heat transfer temperature zone, the first heat generator is switched to the energized state. Still more, when the surface temperature of the seat surface material heated by the second heat generator lowers and falls out of the radiation heat transfer temperature zone, the second heat generator is switched to the energized state. Thereafter, the first heat generator and the second heat generator repeat the energized state and non-energized state so that the surface temperature of the seat surface material is kept within each predetermined temperature zone. As shown in the graph in FIG. 5, the current application can be controlled to always keep the surface temperature of the seat surface material heated by the second heat generator higher than the surface temperature of the seat surface material heated by the first heat generator. However, the current application may also be controlled to achieve the average surface temperature of the seat surface material heated by the second heat generator higher than the average surface temperature of the seat surface material heated by the first heat generator by 3° C. or above, or 5° C. or above.

(Effects)

As described above, seat heater 1 in the present exemplary embodiment can heat the area of vehicle seat 1000 which is relatively strongly pressed by the occupant using the direct heat transfer temperature zone close to the body temperature, and heat other area using the radiation heat transfer temperature zone. This enables to warm the occupant in a wide area at once to improve the quick heating performance. Furthermore, heating according to the thermal perception of the occupant can maintain comfort while warming the occupant.

Second Exemplary Embodiment

Figure 6:
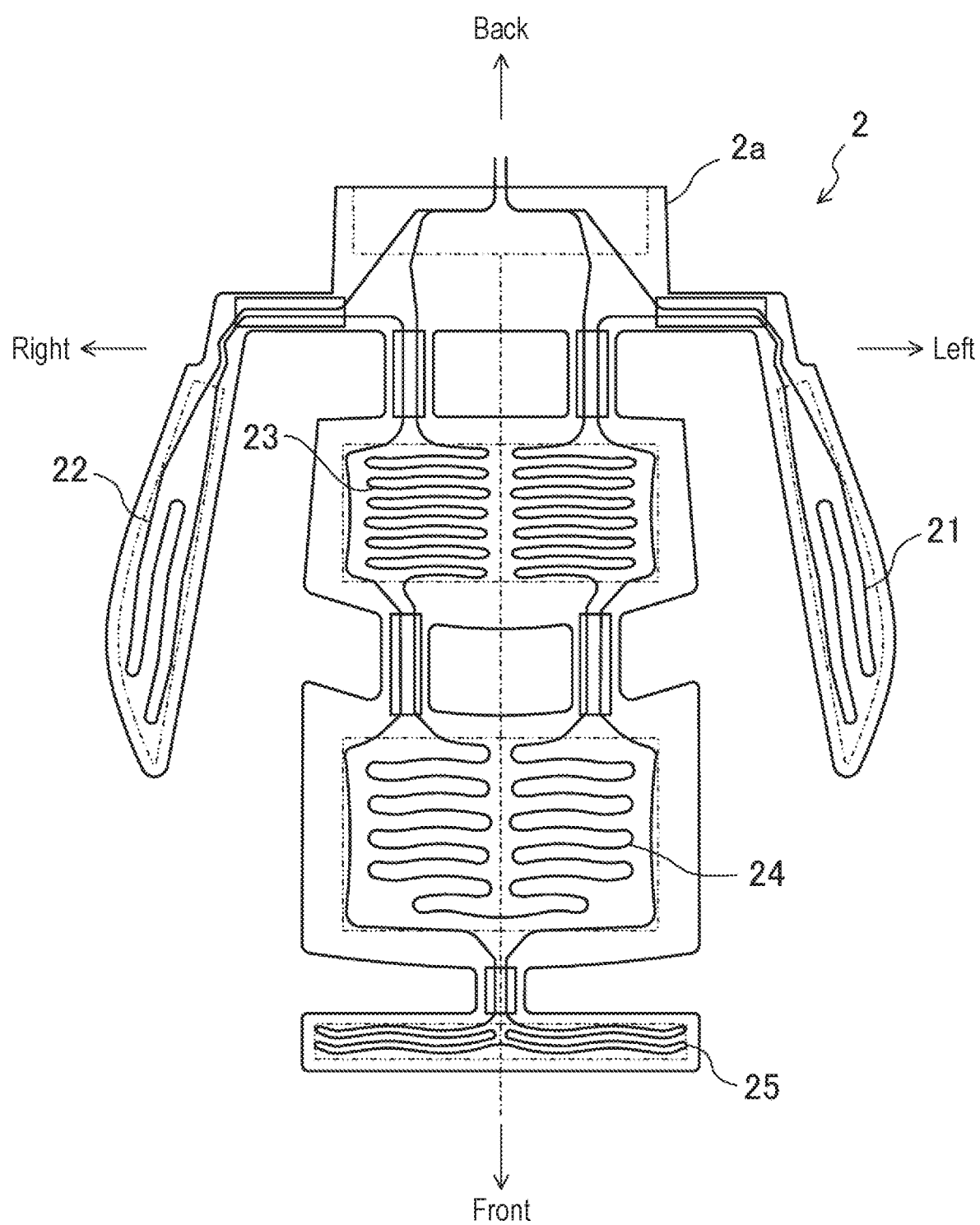
FIG. 6 is a development view of a heat generating unit for a seat cushion of a vehicle seat heater in accordance with a second exemplary embodiment of the present disclosure.
Figure 7:
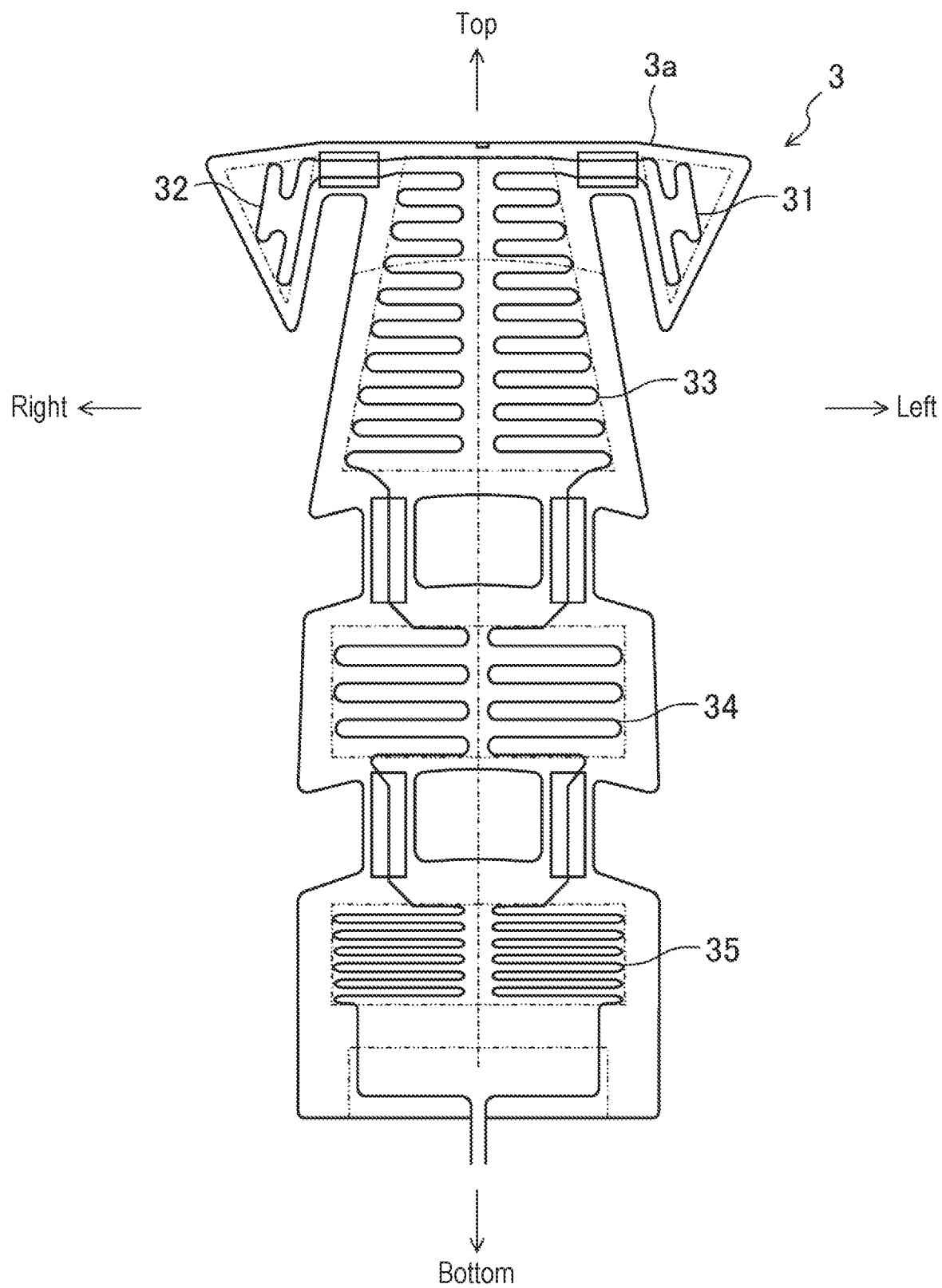
FIG. 7 is a development view of a heat generating unit for a seat back of the vehicle seat heater in accordance with the second exemplary embodiment of the present disclosure.

FIG. 6 and FIG. 7 are development views of first heat generating unit 2 and second heat generating unit 3 in accordance with a second exemplary embodiment of the present disclosure. The present exemplary embodiment differs from the first exemplary embodiment in that the aforementioned wire is densely provided in first heat generating unit 2 and second heat generating unit 3 partially. Other components are same as the first exemplary embodiment. Same reference marks are given to the same components as the first exemplary embodiment to omit duplicate description, and only the difference is detailed below.

As shown in FIG. 6, the wire is more densely provided in first-first heating element 23 of first heat generating unit 2, compared with other heating elements (second-first heating element 21, second-second heating element 22, first-second heating element 24, and second-third heating element 25).

"Densely" means a high density of the wire per unit area. More specifically, it can be achieved by narrowing an interval between adjacent parts of the wire.

The buttocks are highly sensitive to temperature, and a portion of seat body 100 directly under the buttocks is an area to which particularly large force is applied. By densely providing the wire of first-first heating element 23 disposed directly under the buttocks, quick heating performance can be efficiently improved at an extremely low temperature.

Still more, as shown in FIG. 7, the wire is more densely provided in first-fourth heating element 35 of second heat generating unit 3, compared with other heating elements (second-fourth heating element 31, second-fifth heating element 32, second-sixth heating element 33, and first-third heating element 34). The lower back is highly sensitive to temperature and a portion of seat body 100 directly behind the lower back is an area to which particularly large force is applied. By densely providing the wire of first-fourth heating element 35 disposed directly behind the lower back, quick heating performance can be efficiently improved at an extremely low temperature.

Figure 8:
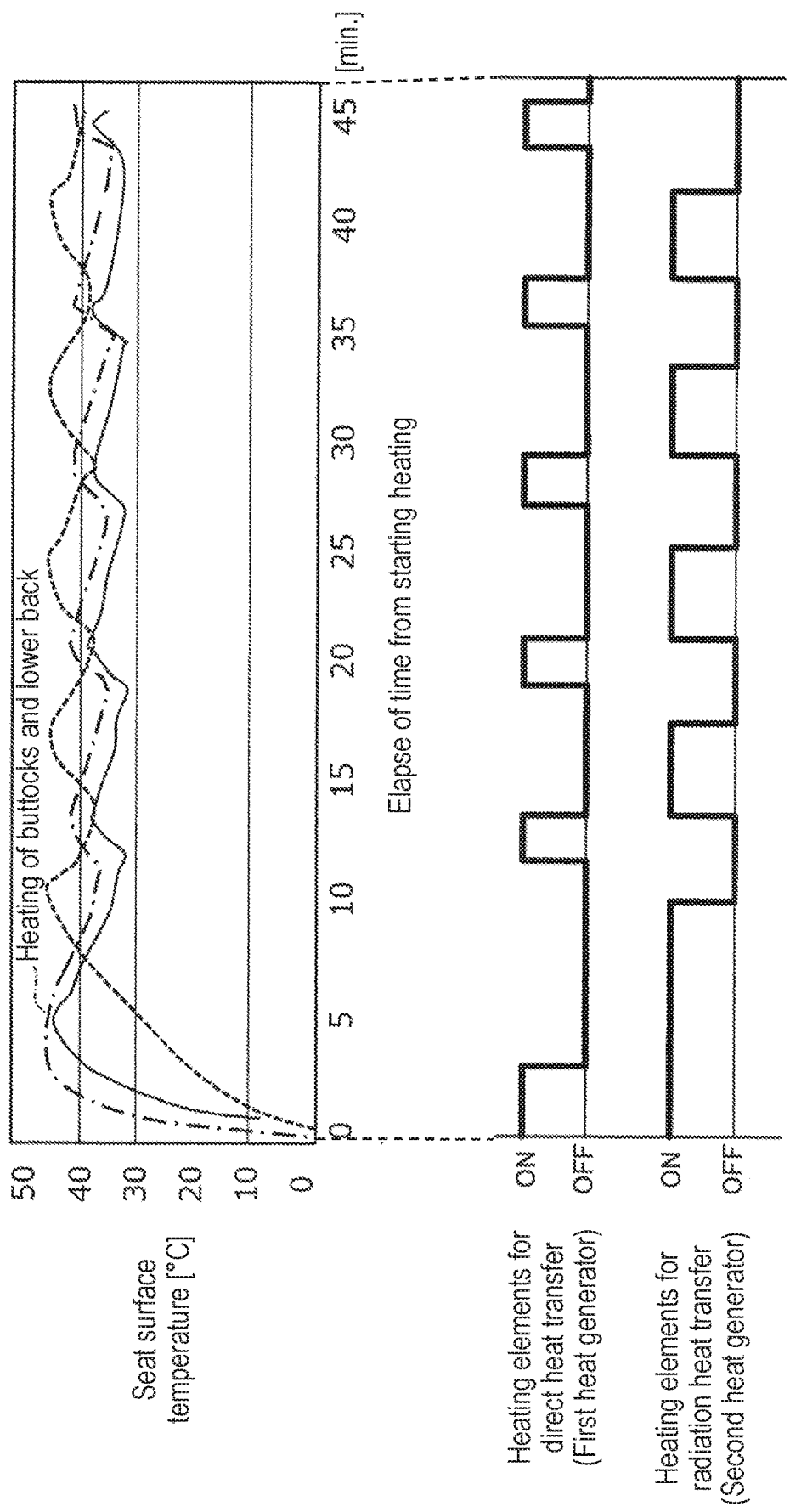
FIG. 8 is a graph showing changes of a seat surface temperature of the vehicle seat and a current application control time chart for heating elements in accordance with the second exemplary embodiment of the present disclosure.

FIG. 8 is a graph showing changes of the seat surface temperature and a current application control time chart of the heating elements in vehicle seat 1000 in the present exemplary embodiment. In the graph shown in FIG. 8, the dash-dot-dash line indicates changes of the surface temperature of the seat surface material heated by first-first heating element 23 and the surface temperature of the seat surface material heated by first-fourth heating element 35. The solid line indicates changes of the surface temperature of the seat surface material heated by first-second heating element 24 and the surface temperature of the seat surface material heated by first-third heating element 34. The broken line indicates changes of the surface temperature of the seat surface material heated by the second heat generator. The surface temperature of the seat surface material heated by first-first heating element 23 and the surface temperature of the seat surface material heated by first-fourth heating element 35 rise faster than the surface temperature (solid line) of the seat surface material heated by first-second heating element 24 and first-third heating element 34.

According to the present exemplary embodiment, the buttocks and lower back can be warmed faster, in addition to the effect of the first exemplary embodiment, thus the quick heating performance is further improved.

Note that the wire may be densely provided only in one of first-first heating element 23 and first-fourth heating element 35.

As described above, the first heat generator may include a first part and a second part; the first part is disposed in an area corresponding to at least one of the occupant's buttocks and lower back, and the second part is disposed in an area corresponding to the occupant's thigh. The first part is at least one of first-first heating element 23 and first-fourth heating element 35, and the second part is first-second heating element 24. Still more, a heat flux of the first part is set higher than a heat flux of the second part. More specifically, the wire is densely provided in the first part, compared with that in the second part. Alternatively, controller 4 may control the current applied to each heating element in a manner such that the heat flux of the first part is greater than the heat flux of the second part.

Third Exemplary Embodiment

Figure 9:
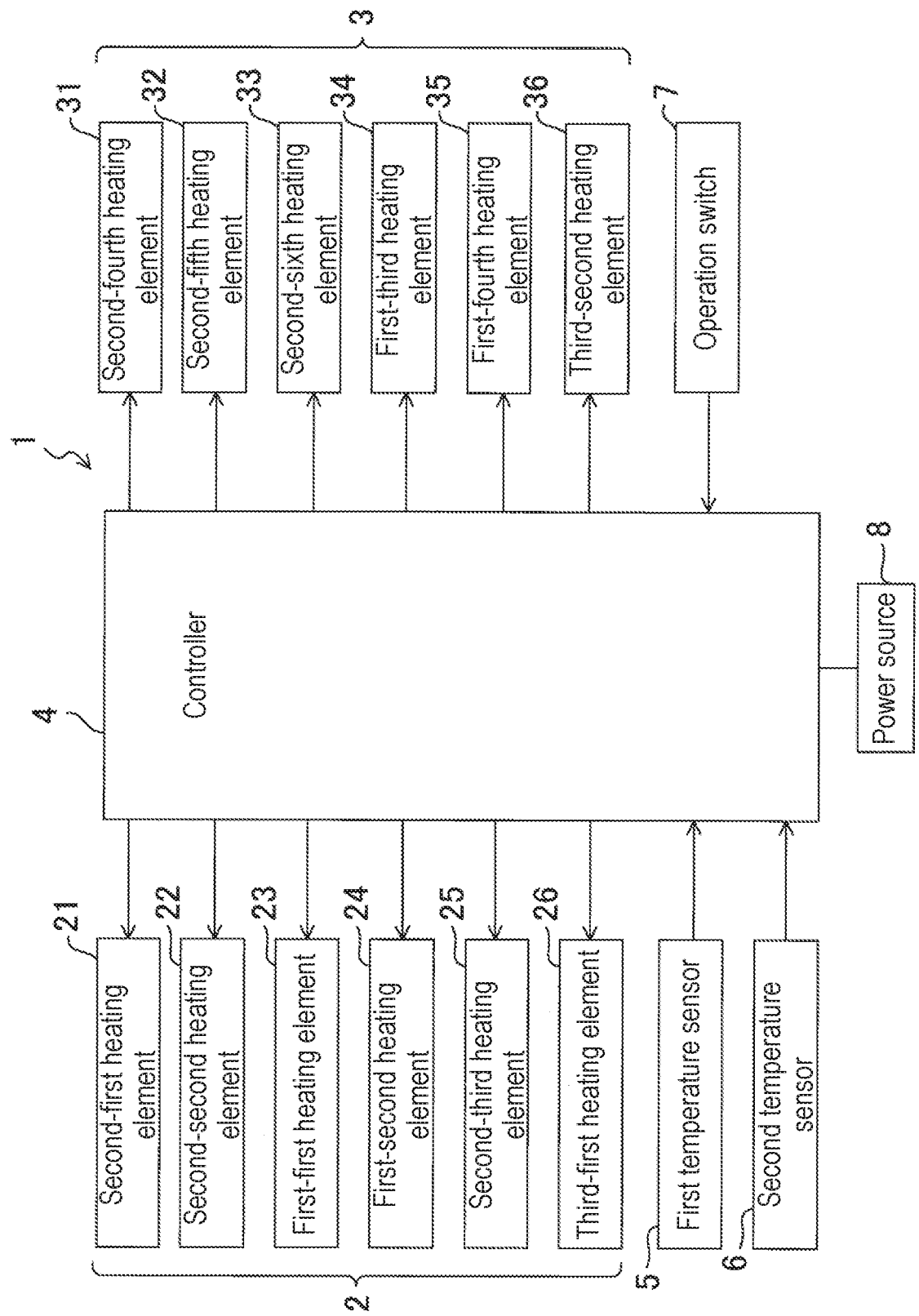
FIG. 9 is a block diagram of a vehicle seat heater in accordance with a third exemplary embodiment of the present disclosure.

FIG. 9 shows a configuration of seat heater 1 in accordance with a third exemplary embodiment of the present disclosure. Seat heater 1 in the present exemplary embodiment differs from the first exemplary embodiment in that seat heater 1 further includes auxiliary buttocks heating element (hereinafter referred to as "third-first heating element") 26 and auxiliary lower back heating element (hereinafter referred to as "third-second heating element") 36. Other components are same as the first exemplary embodiment. Same reference marks are given to the same components as the first exemplary embodiment to omit duplicate description, and only the difference is detailed below. Third-first heating element 26 and third-second heating element 36 include the aforementioned wires.

Figure 10:
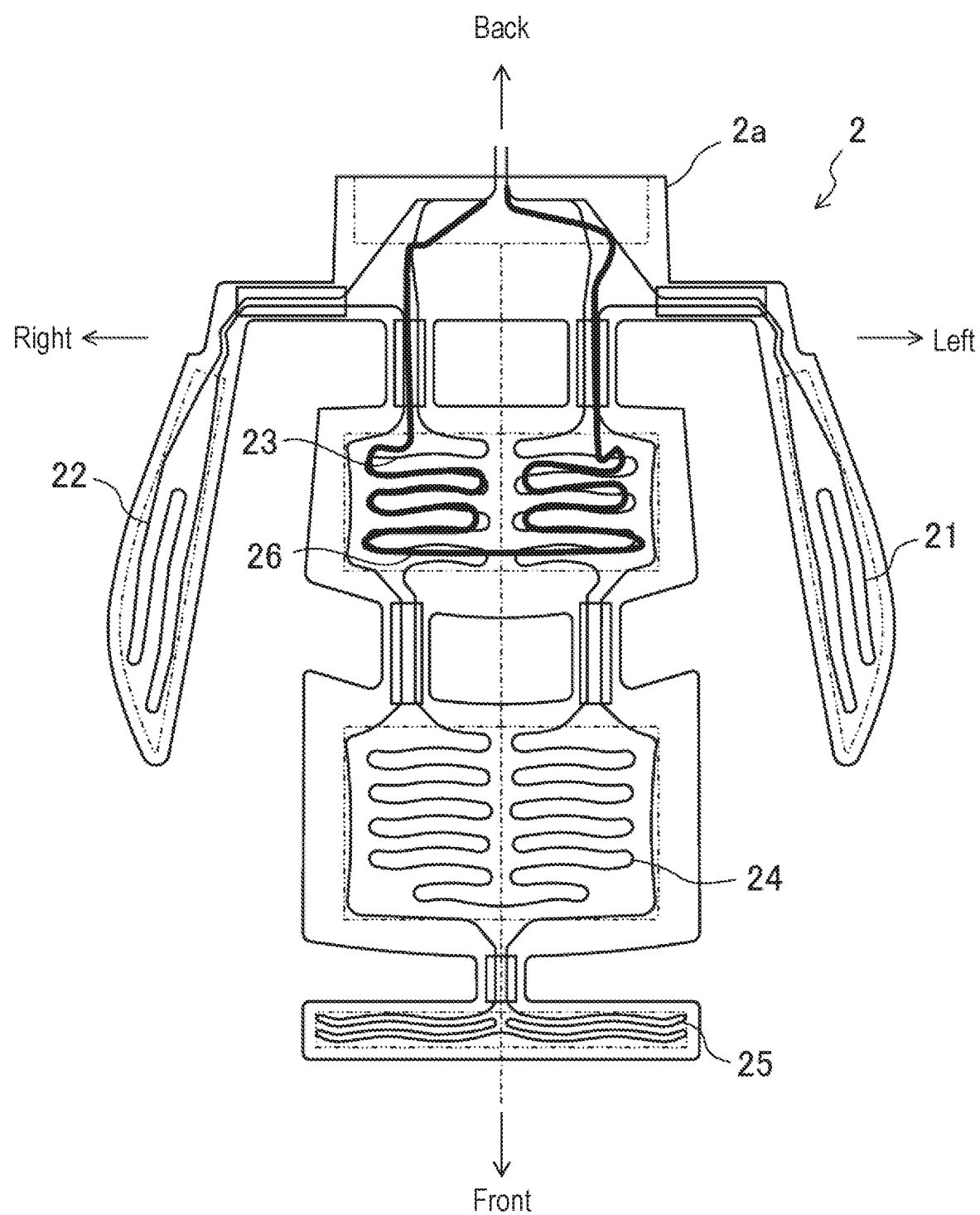
FIG. 10 is a development view of a heat generating unit for a seat cushion of the vehicle seat heater in accordance with the third exemplary embodiment of the present disclosure.
Figure 11:
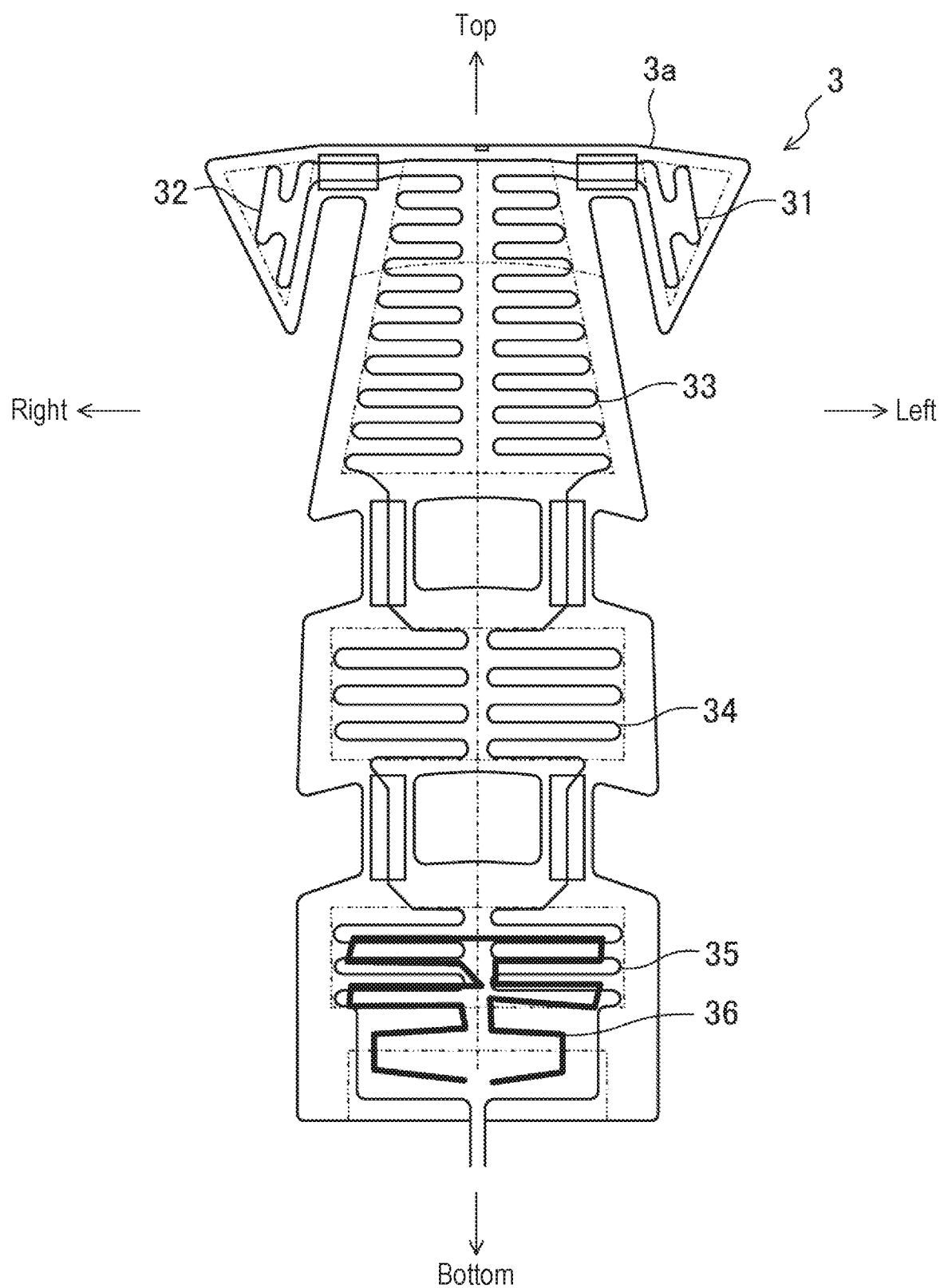
FIG. 11 is a development view of a heat generating unit for a seat back of the vehicle seat heater in accordance with the third exemplary embodiment of the present disclosure.

FIG. 10 and FIG. 11 are development views of first heat generating unit 2 and second heat generating unit 3 in the present exemplary embodiment. Third-first heating element 26 shown in FIG. 10 is disposed in an area in seat body 100 corresponding to the occupant's buttocks (first area A1 in FIG. 1), and generates heat by current application. Third-first heating element 26 is part of the third heat generator. Third-first heating element 26 overlaps with first-first heating element 23 vertically. Accordingly, third-first heating element 26 also warms the buttocks. First-first heating element 23 may be disposed below or above third-first heating element 25.

Third-second heating element 36 shown in FIG. 11 is disposed in an area in seat body 100 corresponding to the occupant's lower back (first area A1 in FIG. 1), and generates heat by current application. Third-second heating element 36 is part of the third heat generator. Third-second heating element 36 overlaps with first-fourth heating element 35 back and forth. Accordingly, third-second heating element 36 also warms the lower back. First-fourth heating element 35 may be disposed in front or back of third-second heating element 36.

A heat flux of each of third-first heating element 26 and third-second heating element 36 is set to be larger than a heat flux of each of first-first heating element 23, first-second heating element 24, first-third heating element 34, and first-fourth heating element 35.

As shown in FIG. 9, third-first heating element 26 and third-second heating element 36 are connected to controller 4. Controller 4 controls the current application to each of third-first heating element 26 and third-second heating element 36.

Figure 12:
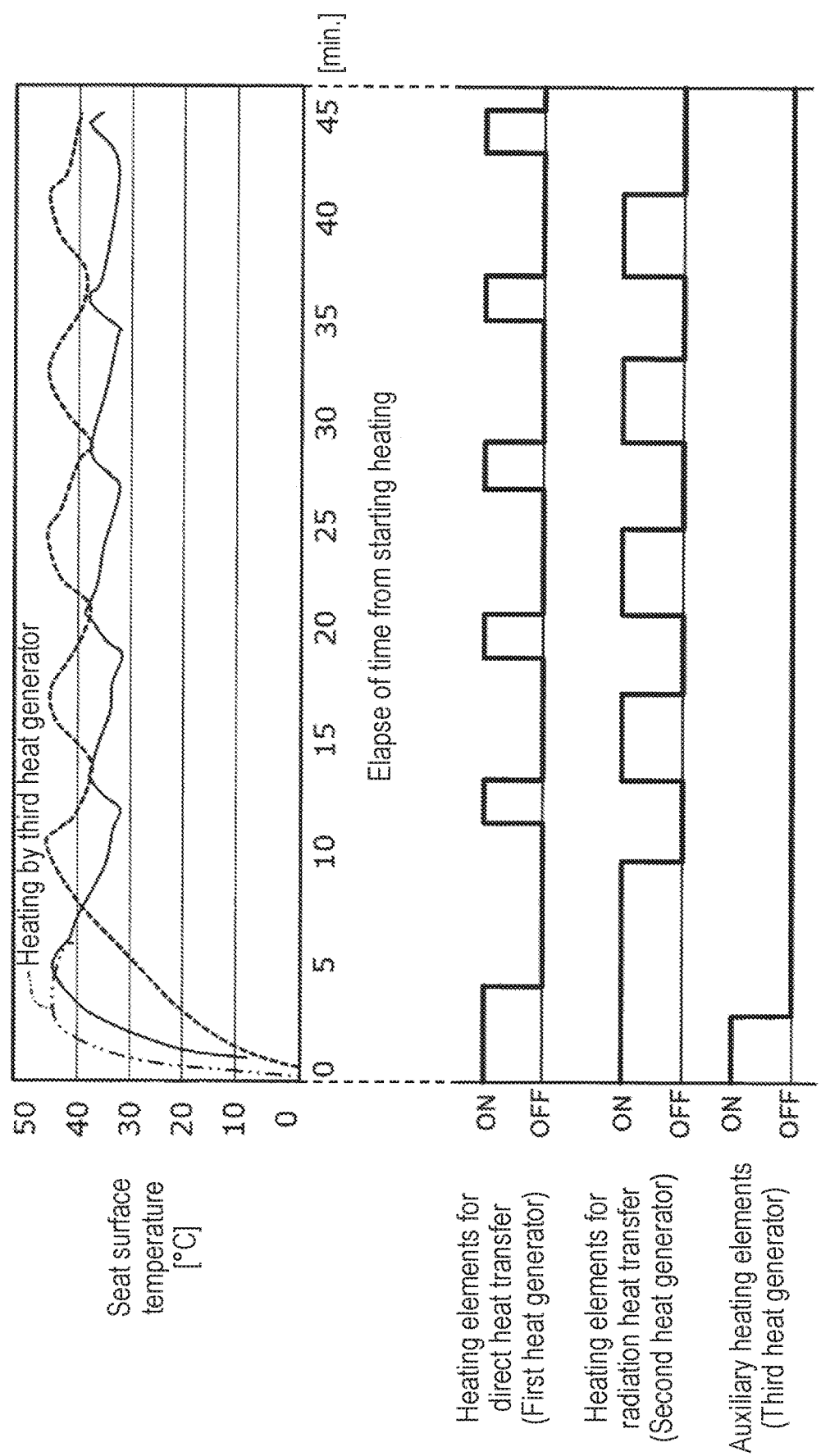
FIG. 12 is a graph showing changes of a seat surface temperature of the vehicle seat and a current application control time chart for heating elements in accordance with the third exemplary embodiment of the present structure.

FIG. 12 shows a graph showing changes of the seat surface temperature of vehicle seat 1000 and current application control time chart of the heating elements in the exemplary embodiment. Same as FIG. 5, the solid line indicates the surface temperature of the seat surface material heated by the first heat generator, and the broken line indicates the surface temperature of the seat surface material heated by the second heat generator in FIG. 12. The two-dotted line indicates the surface temperature of the seat surface material heated by the third heat generator (third-first heating element 26 and third-second heating element 36).

As shown in the lowest part of the time chart in FIG. 12, current is applied to third-first heating element 26 and third-second heating element 36 at starting heating, same as other heating elements. A heat flux of each of third-first heating element 26 and third-second heating element 36 is set larger than a heat flux of each of other heating elements. Accordingly, the surface temperature of the seat surface material for the buttocks and lower back rises faster than the surface temperature of other areas.

According to the present exemplary embodiment, the buttocks and lower back can be warmed faster, thus the quick heating performance is further improved, same as the second exemplary. Still more, since the current applied to each of first-first heating element 23 and first-fourth heating element 35 can be continued after switching third-first heating element 26 and third-second heating element 36 to the non-energized state, a large change in the heat flux can be suppressed. This reduces uncomfortable perception by the occupant related to the change in the heat flux.

Note that one of third-first heating element 26 and third-second heating element 36 may be omitted.

As described above, seat heater 1 may further include the third heat generator disposed in an area corresponding to at least one of the occupant's buttocks and lower back, and generates heat by current application. In this case, the first heat generator overlaps with the third heat generator. The controller is further configured to control current application to the third heat generator.

Other Exemplary Embodiment

The foregoing embodiments are merely illustrative in nature and not restrictive. Further, all changes and modifications which come within the meaning of appended claims are intended to be embraced therein.

For example, first-first heating element 23 and first-fourth heating element 35 in the second exemplary embodiment may be combined with third-first heating element 26 and third-second heating element 36 in the third exemplary embodiment, respectively. For example, first-first heating element 23 in the second exemplary embodiment and third-second heating element 36 in the third exemplary embodiment may be combined. First-fourth heating element 35 in the second exemplary embodiment and third-first heating element 26 in the third exemplary embodiment may be combined.

Furthermore, the current application may be controlled to achieve the radiation heat transfer temperature zone in some heating elements of the first heat generator. For example, part of the back thigh close to knee may be separated from or in slight contact with the seat when the occupant operates the brake pedal or accelerator pedal provided in the vehicle. In other words, the contact state of the seat and occupant's body part may differ between the driving operation state and the non-operation state. The first heat generator may be provided for warming the body part separated from or in slight contact with the seat and the radiation heat transfer temperature zone may be applied to warm only this part. This control enhances comfort.

As described above, the present disclosure is applicable to, for example, a driver's seat, a front passenger's seat, and a rear seat of vehicles.

What is claimed is:

1. A vehicle seat heater provided in a vehicle seat, the vehicle seat heater comprising:
   a first heat generator disposed in a first area of the vehicle seat, and configured to generate heat by current application, the first area supporting an occupant in the vehicle seat;
   a second heat generator disposed in a second area of the vehicle seat, and configured to generate heat by current application, the second area not being in contact with the occupant or being less pressed by the occupant than the first area is; and
   a controller configured to control the current application to the first heat generator in a manner such that a heating temperature zone of the first heat generator is a direct heat transfer temperature zone close to a body temperature of the occupant, and control the current application to the second heat generator in a manner such that a heating temperature zone of the second heat generator is a radiation heat transfer temperature zone.

2. The vehicle seat heater according to claim 1, wherein the controller controls the current application to the first heat generator and the current application to the second heat generator in a manner such that the radiation heat transfer temperature zone is higher than the direct heat transfer temperature zone.

3. The vehicle seat heater according to claim 1, wherein the controller controls the current application to the first heat generator to achieve a heat flux of the heat generated by the first heat generator of 300 W/m$^2$ or greater and 500 W/m$^2$ or less during heating by the first heat generator.

4. The vehicle seat heater according to claim 1, wherein the controller controls the current application to the second heat generator to achieve a heat flux of the heat generated by the second heat generator of 200 W/m$^2$ or greater and 400 W/m$^2$ or less during heating by the second heat generator.

5. The vehicle seat heater according to claim 1, wherein the first heat generator includes a first part and a second part, the first part being disposed in an area corresponding to at least one of buttocks and lower back of the occupant in the vehicle seat, and the second part being disposed in an area corresponding to thigh of the occupant in the vehicle seat, and
   a heat flux of the first part is set higher than a heat flux of the second part.

6. The vehicle seat heater according to claim 5, wherein the first heat generator includes a wire that generates Joule heat by the current application, and
   the wire is more densely provided in the first part than the second part.

7. The vehicle seat heater according to claim 1, further comprising:
   a third heat generator disposed in an area corresponding to at least one of buttocks and lower back of the occupant in the vehicle seat, and configured to generate heat by current application,
   wherein the first heat generator is disposed so as to overlap with the third heat generator, and
   the controller further configured to control current application to the third heat generator.

8. The vehicle seat heater according to claim 1, wherein the first heat generator includes a plurality of first heat generators, and
   the controller controls the current application to each of the plurality of first heat generators in a manner such that one or more but not all of the plurality of first heat generators is controlled in the radiation heat transfer temperature zone.

9. A vehicle seat comprising:
   the vehicle seat heater of claim 1, and
   a vehicle seat body in which the first heat generator and the second heat generator of the vehicle seat heater are installed.

* * * * *